United States Patent
Takaragi

(10) Patent No.: US 7,315,925 B2
(45) Date of Patent: Jan. 1, 2008

(54) DISABLING ACCESS BASED ON LOCATION

(75) Inventor: Yoichi Takaragi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 10/555,308

(22) PCT Filed: Nov. 10, 2004

(86) PCT No.: PCT/JP2004/017041

§ 371 (c)(1),
(2), (4) Date: Nov. 2, 2005

(87) PCT Pub. No.: WO2005/050458

PCT Pub. Date: Jun. 2, 2005

(65) Prior Publication Data

US 2006/0212664 A1    Sep. 21, 2006

(30) Foreign Application Priority Data

Nov. 20, 2003    (JP)    ............................... 2003-391064

(51) Int. Cl.
G06F 12/14 (2006.01)
G06F 15/00 (2006.01)

(52) U.S. Cl. ........................ 711/163; 711/112; 711/152; 711/154

(58) Field of Classification Search ................ 711/112, 711/152, 154, 163
See application file for complete search history.

(56) References Cited

U.S. PATENT DOCUMENTS

| 6,775,023 | B1 | 8/2004 | Fukunaga et al. | 358/1.15 |
| 7,124,265 | B2* | 10/2006 | Nagasoe et al. | 711/163 |
| 2003/0051107 | A1* | 3/2003 | Shimizu et al. | 711/154 |
| 2003/0061166 | A1 | 3/2003 | Saito et al. | 705/54 |
| 2003/0110011 | A1 | 6/2003 | Kyotoku | 702/186 |
| 2004/0010665 | A1* | 1/2004 | Agarwal et al. | 711/154 |
| 2004/0205314 | A1* | 10/2004 | Babudri et al. | 711/163 |
| 2005/0138314 | A1* | 6/2005 | Liang et al. | 711/163 |
| 2007/0174573 | A1* | 7/2007 | Shiota et al. | 711/163 |

FOREIGN PATENT DOCUMENTS

| JP | 9-81516 | 3/1997 |
| JP | 09-319662 | 12/1997 |
| JP | 10-293728 | 11/1998 |
| JP | 2000-105677 | 4/2000 |
| JP | 2001-306530 | 11/2001 |
| JP | 2003-18652 | 1/2003 |
| JP | 2003-99400 | 4/2003 |

* cited by examiner

*Primary Examiner*—Jack Lane
(74) *Attorney, Agent, or Firm*—Fitzpatrick, Cella, Harper & Scinto

(57) ABSTRACT

The present invention specifies a location by externally receiving a signal, and disables from reading data stored in a recording medium in accordance with the specified location, thereby enabling to perform a process of preventing data leakage when a data storage apparatus is used at a location other than a predetermined location.

14 Claims, 12 Drawing Sheets

FIG. 6

EXAMPLE OF ACCESS CONTROL INFORMATION TO BE HELD IN DATA STORAGE APPARATUS 102

- CURRENT LOCATION INFORMATION ~600
  - › 31 LIVING ROOM (WINDOW SIDE)
- NETWORK ACTIVATION PERMISSION LOCATION INFORMATION ~601
  - › 31 LIVING ROOM
- HD INSTALLATION PERMISSION LOCATION INFORMATION ~602
  - › 31 LIVING ROOM
  - › 32 LIVING ROOM
- GROUP EQUIPMENT INSTALLATION LOCATION INFORMATION ~603
  - › NATTO1 : 31 LIVING ROOM, 32 LIVING ROOM, 42 LABORATORY, 43 LABORATORY
  - › NATTO2 : 31 LIVING ROOM, 32 LIVING ROOM, 44 LABORATORY
- CORRESPONDENCE INFORMATION OF GROUP ID AND ACCESS KEY

| GROUP ID ~604 | ACCESS KEY ~605 |
  | --- | --- |
  | › NATTO1 | XXX |
  | › NATTO2 | YYY |

FIG. 7

EXAMPLE OF ACCESS CONTROL INFORMATION TO BE HELD IN EACH OF MFP's 103a, 103b, 103c
- CURRENT LOCATION INFORMATION ~700
> 31 LIVING ROOM (WINDOW SIDE)
- GROUP EQUIPMENT INSTALLATION LOCATION INFORMATION ~501
> 31 LIVING ROOM, 32 LIVING ROOM, 42 LABORATORY, 43 LABORATORY,
- CORRESPONDENCE INFORMATION OF GROUP ID AND ACCESS KEY
    GROUP ID ~502        ACCESS KEY ~503
> NATTO1                XXX
- BOX DISCRIMINATION INFORMAATION ~504
> SHARED BOX-A

FIG. 8

EXAMPLE OF ACCESS CONTROL INFORMATION TO BE HELD IN MFP 104
- CURRENT LOCATION INFORMATION ~700
> 32 LIVING ROOM
- GROUP EQUIPMENT INSTALLATION LOCATION INFORMATION ~501
> 31 LIVING ROOM, 32 LIVING ROOM, 44 LABORATORY
- CORRESPONDENCE INFORMATION OF GROUP ID AND ACCESS KEY
    GROUP ID ~502        ACCESS KEY ~503
> NATTO2                YYY
- BOX DISCRIMINATION INFORMAATION ~504
> SHARED BOX-A

DISABLING ACCESS BASED ON LOCATION

TECHNICAL FIELD

The present invention relates to a data storage apparatus which stores data, a data processing apparatus which can perform input and output processes with respect to data of, e.g., a multifunctional machine or the like, an information processing system which includes at least the data storage apparatus and the data processing apparatus, and a data storage method which stores data by using the data storage apparatus.

BACKGROUND ART

In recent years, a technique that access of data stored in an apparatus is controlled based on location information of the apparatus has been developed. In this technique, for example, with respect to a specific file which was created at a user's residence and has been stored in a computer, if the current location of the computer obtained by using, e.g., a GPS (Global Positioning System) function is a location other than the user's residence, access to the specific file (e.g., a diary file) is inhibited.

Similarly, there is a technique that latitude/longitude information representing an installation location of a semiconductor manufacturing apparatus is compared and checked with latitude/longitude information representing an installation location of a user apparatus to which remote access should be permitted, and the remote access is disconnected when it is judged as the result of the comparison that the information representing the installation location of the user apparatus is wrong (e.g., Japanese Patent Application Laid-Open No. 2001-306530).

Moreover, there is a technique that specific information representing an image storage apparatus of storing image data is administrated. More specifically, when the image data is requested from an external apparatus, the image storage apparatus of storing the image data is specified based on the specific information. Thus, for example, the storage location of the image data can be freely and easily changed without deteriorating user's convenience by specifying the image storage apparatus of storing the image data in question on the basis of the specific information (e.g., Japanese Patent Application Laid-Open No. 2000-105677).

Besides, in recent years, external storage apparatuses such as a hard disk drive and the like become small but have large capacities, whereby it is easier to store large-amount data in the external storage apparatus and then bring/move it to an arbitrary location. Moreover, for example, there is a technique that various kinds of office automation equipment such as a multifunctional machine and the like connected to a network such as an internal LAN or the like has a hard disk drive of storing processed data built-in or use an external apparatus connected to the network.

However, when it is thought that downsizing and mass storage have a negative side, there is a problem that an external storage apparatus (data storage apparatus) disposed at a location where secret data should be administrated is brought out forth by a person who has an evil intention, and thus the data stored in the storage apparatus might leak. Thus, a demand for improvement of the technique capable of dealing with this problem is deep.

In addition, there is a problem that, if the data to be administrated in each office automation equipment (i.e., data processing apparatus) connected to the network is distributed and stored/processed, a data capacity increases, and the data administration is more complicated and difficult.

DISCLOSURE OF THE INVENTION

The present invention specifies a location by externally receiving a signal, and disables from reading data stored in a recording medium according to the specified location, thereby enabling to perform a process of preventing data leakage when a data storage apparatus is used at a location other than a predetermined location.

Further, the present invention receives location information externally, and disables from reading data stored in the recording medium according to the location represented by the received location information, thereby enabling to perform the process of preventing the data leakage when the data storage apparatus is used at a location other than the predetermined location.

Furthermore, the present invention receives location information being the information concerning a data storage apparatus installation location from the data storage apparatus having a recording medium for storing data, and judges based on the location represented by the received location information whether or not to use the data storage apparatus, thereby enabling to perform the process of preventing the data leakage when the data storage apparatus is used at a location other than the predetermined location.

BRIEF DESCRIPTION OF THE DRAWINGS

FIG. 6 is a diagram showing an example of the access control information to be held in the data storage apparatus 102;

FIG. 7 is a diagram showing an example of the access control information to be held in the MFP's 103a to 103c and the MFP 104;

FIG. 8 is a diagram showing an example of access control information to be held in the MFP 104;

BEST MODE FOR CARRYING OUT THE INVENTION

Hereinafter, the embodiment of the present invention will be explained in detail with reference to the accompanying drawings.

Initially, the schematic structure of an information processing system which is equipped with a data storage apparatus according to the embodiment of the present invention and network equipment (data processing apparatus) will be explained. More specifically, FIG. 1 is a diagram showing the schematic structure of the information processing system equipped with the data storage apparatus according to the embodiment and the network equipment (data processing apparatus).

Figure 1:
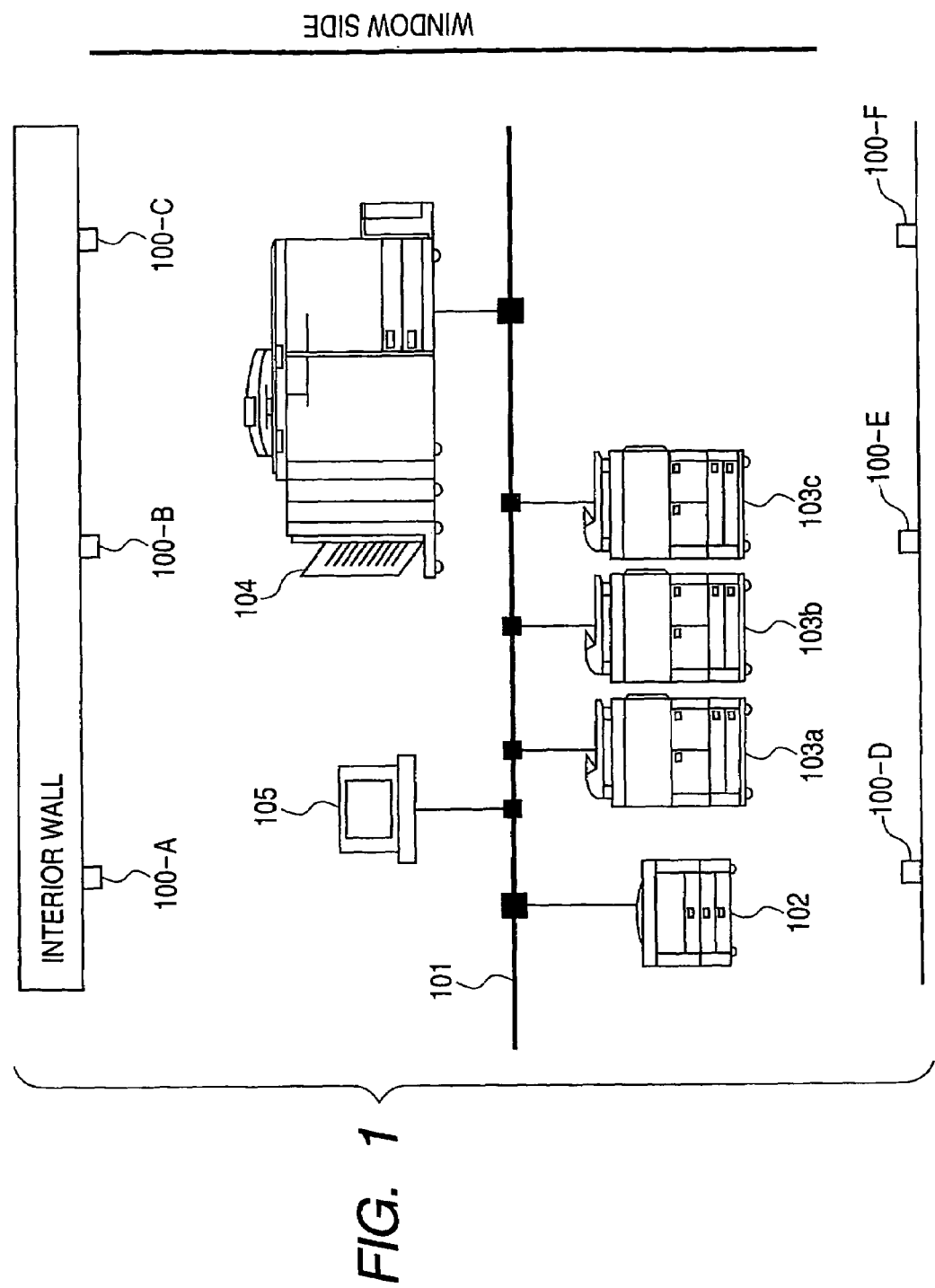
FIG. 1 is a diagram showing the schematic structure of an information processing system which is equipped with a data storage apparatus according to the embodiment of the present invention and network equipment (data processing apparatus)

In FIG. 1, numerals 103*a*, 103*b*, 103*c* and 104 respectively denote data processing apparatuses acting as the network equipment. For example, the data processing apparatus is a multifunctional apparatus, called an MFP (Multi Function Peripheral), which has a multi-purpose function. The data processing apparatuses 103*a* to 103*c* and 104 are respectively connected to a network 101. Here, it is assumed throughout the present application that the network equipment, the multifunctional apparatus, and the MFP are all equivalent to the data processing apparatus. In the embodiment, the network equipment 104, which is also called the MFP 104, is the color MFP capable of performing scanning, printing and the like in full color. Similarly, the network equipments 103*a* to 103*c*, which are also called the MFP's 103*a* to 103*c*, are the black-and-white MFP's capable of performing scanning, printing and the like in black and white. Numeral 105 denotes a computer terminal which has a function to connect with the network 101, and a function to use a data storage apparatus 102 and the MFP's 103*a* to 103*c* and 104. That is, the computer terminal 105 is the general computer terminal which is used by a user for creating a document or the like. Incidentally, the computer terminal 105 is equipped with a display device such as a CRT (cathode ray tube), an LCD (liquid crystal display) and the like, and an input device such as a keyboard, a mouse and the like capable of being handled by the user.

Numeral 102 denotes the data storage apparatus 102 which can be connected to the network 101 and is equipped with a storage medium (or recording medium) of storing various data. More specifically, the data storage apparatus 102 contains as the recording medium a hard disk and connects with the network 101 by using an iSCSI (Internet SCSI (Small Computer System Interface)) protocol. Here, it should be noted that the iSCSI protocol is the protocol which is available to transmit and receive, through an IP (Internet Protocol) network, an SCSI command used in the communication between a storage and a computer. That is, by using the iSCSI protocol, it is possible to directly connect the data storage apparatus such as a large-capacity hard disk or the like onto a TCP/IP (Transmission Control Protocol/Internet Protocol) network such as an inter-office LAN (local area network) or the like, and it is thus possible to share the connected data storage apparatus by plural computers.

Figure 5:
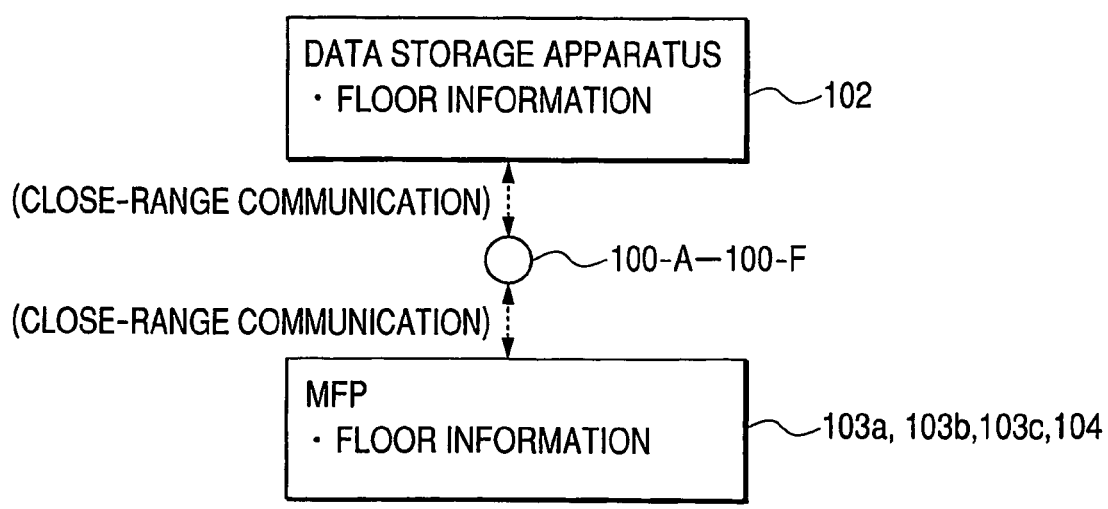
FIG. 5 is a diagram showing that the location information provisioning terminals 100-A to 100-F provide location information to the data storage apparatus 102, the MFP's 103a to 103c, and the MFP 104 through close-range communication.

As described above, the data storage apparatus 102 saves and stores various data transmitted from the MFP's 103*a* to 103*c* and 104 through the network 101. Numerals 100-A, 100-B, 100-C, 100-D, 100-E and 100-F respectively denote location information provisioning terminals each of which provides location information to the data storage apparatus 102 and the MFP's 103*a* to 103*c* and 104 through close-range communication using radio as shown in FIG. 5. Besides, each of the location information provisioning terminals 100-A to 100-F stores floor information (representing, e.g., a floor number and a living room (or sitting room) number where the terminal in question is installed) as location information for specifying the location where each of the location information provisioning terminals 100-A to 100-F is installed, whereby such floor number information is transmitted as the location information in response to requests from the data storage apparatus 102 and the MFP's 103*a* to 103*c* and 104. Incidentally, the location information is not limited to the floor number information. That is, as the location information, it is preferable to use various information such as information concerning latitude/longitude, information concerning virtual coordinates in a living room, and the like, according to a range and an object which are intended to administrate the installation location of the data storage apparatus 102.

(Structural Example of MFP's 103*a* to 103*c* and 104)

Next, an example of the internal structure of each of the MFP's 103*a* to 103*c* and 104 will be explained.

Figure 2:
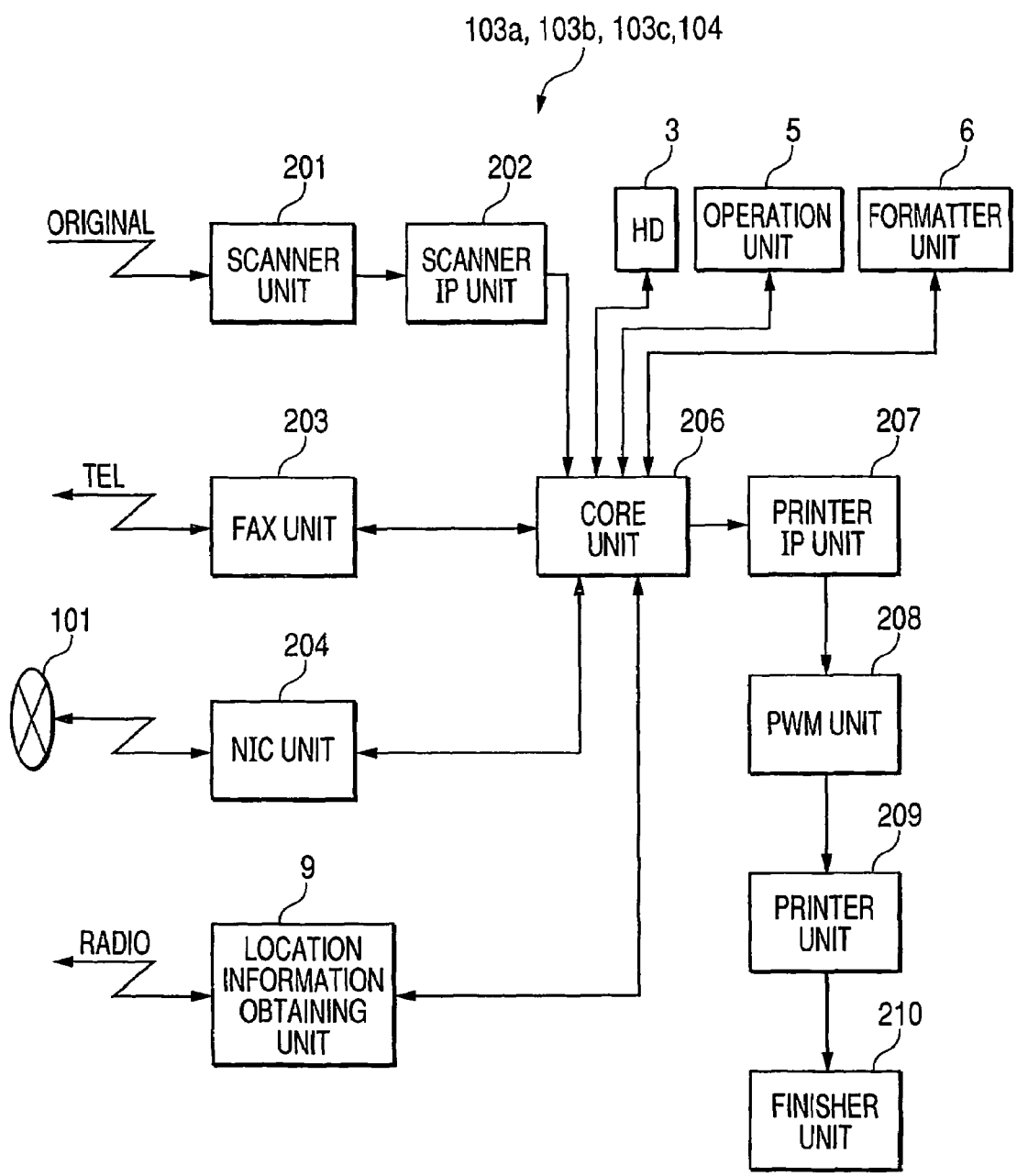
FIG. 2 is a block diagram showing an example of the internal structure of each of the MFP's (Multi Function Peripherals) 103a, 103b, 103c and 104 shown in FIG. 1.

FIG. 2 is a block diagram showing the example of the internal structure of each of the MFP's 103*a* to 103*c* and 104. Here, as previously described, the MFP 104 can process color images and documents, while the MFP's 103*a* to 103*c* can process black and white images and documents. That is, the difference between the MFP 104 and the MFP's 103*a* to 103*c* is only the above point, and other parts of the MFP 104 are substantially equivalent to those of the MFP's 103*a* to 103*c*. For this reason, in the following, FIG. 2 will be explained with respect to the structure of the MFP 104, and the structure of each of the MFP's 103*a* to 103*c* will be incidentally explained as needed.

In FIG. 2, numeral 3 denotes an HD (hard disk) which is provided in the MFP 104 and stores various data as needed, and numeral 5 denotes an operation unit which includes a display part and an operation part. The display part is equipped with a screen that a user watches when handling the MFP 104, and the operation part is equipped with buttons and the like that the user handles according to the displayed contents of the display part. Numeral 6 denotes a formatter unit which extracts PDL (page-description language) data into image data.

Numeral 201 denotes a scanner unit which reads the image data from an original, and numeral 202 denotes a scanner IP (image processor) unit which performs an image process to the image data read by the scanner unit 201. Numeral 203 denotes a FAX unit, typified by general facsimile or the like, which transmits and receives the image data by using a telephone line, and numeral 204 denotes an NIC (network interface card) unit which transmits and receives the image data and device information through the network 101. Besides, a PDL unit is provided to extract the PDL data transmitted from a computer side into an image signal (e.g., bitmap image signal). Numeral 206 denotes a core unit which controls the respective units, temporarily stores the image signals, and determines data input/output paths, in accordance with use of the MFP 104. Here, the HD 3, the operation unit 5, the formatter unit 6 and a location information obtaining, unit 9 are connected to the core unit 206.

The image data output from the core unit 206 is processed through a printer IP (image processor) unit 207 and a PWM (pulse width modulation) unit 208, and then the processed data is input to a printer unit 209. Then, in the printer unit 209, an image formation (print) process for a paper (printing media) is performed based on the input image data, and the print-processed papers are output to a finisher unit 210 and then subjected to a finishing process. Besides, the location information obtaining unit 9 obtains the location information from closest one of the location information provisioning terminals 100-A to 100-F through radio communication, and transfers the obtained information to the core unit 206. Thus, the MFP's 103a to 103c and 104 resultingly have the location information obtaining unit 9. Consequently, even in a case where the installation location of the MFP changes or an organization which uses the MFP changes (e.g., a change in personnel occurs); if the location information of the MFP's capable of being used in the print process is beforehand set by an administrator or the like of the network 101, it is possible to prevent that a user erroneously uses the before-change MFP.

(Explanation of Core Unit 206)

Figure 3:
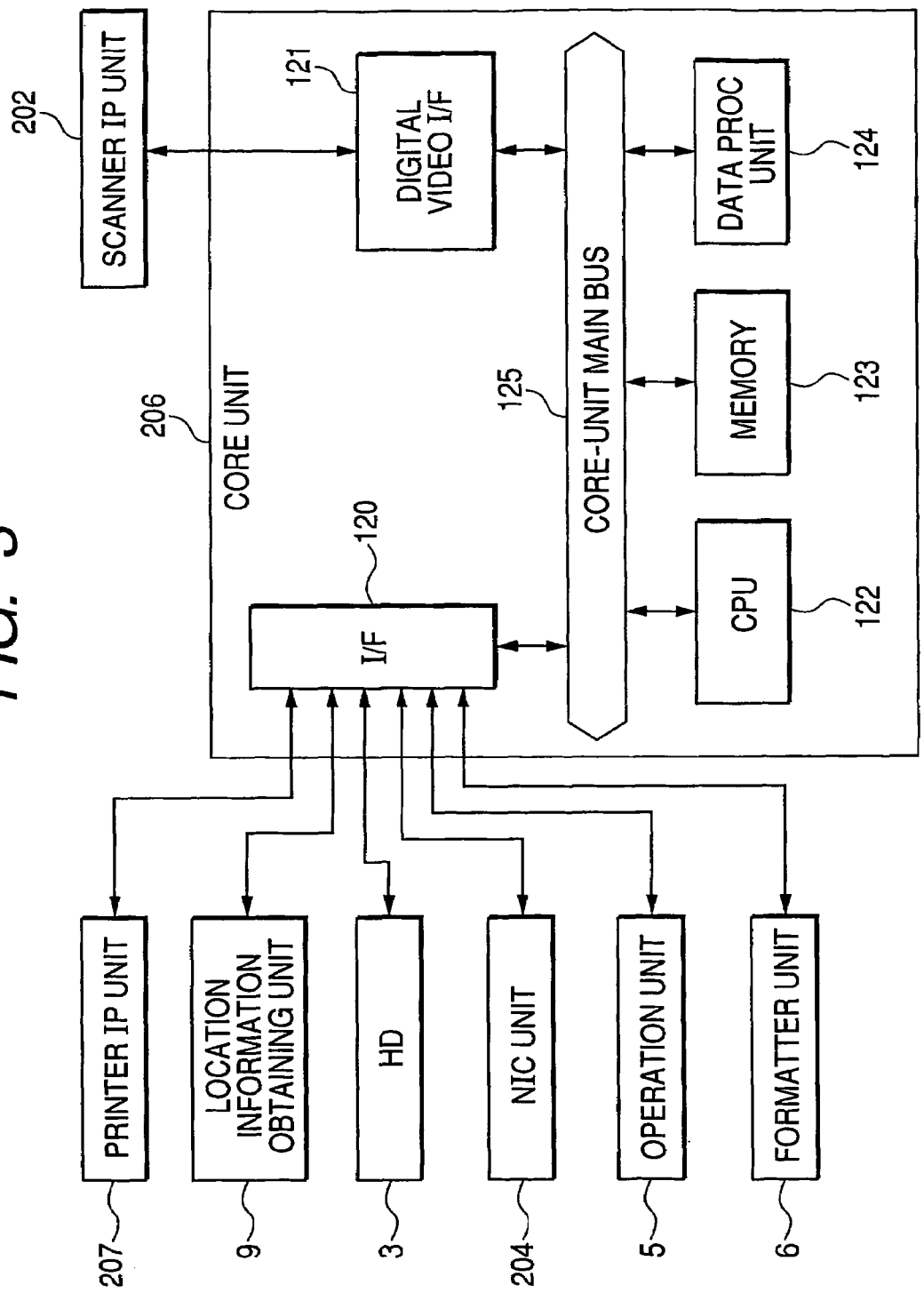
FIG. 3 is a block diagram showing an example of the hardware structure of the core unit 206 shown in FIG. 2 and its peripheral units.

FIG. 3 is a block diagram showing an example of the hardware structure of the core unit 206 shown in FIG. 2 and its peripheral units. The core unit 206 includes a digital video I/F (interface) 121. Thus, the core unit 206 is connected to the scanner IP unit 202 through the digital video I/F 121. In the meantime, the core unit 206 is connected to the HD 3, the operation unit 5, the formatter unit 6, the NIC unit 204 and the location information obtaining unit 9 respectively shown in FIG. 2 through a core-unit main bus 125 (simply called a main bus 125 hereinafter) and an I/F 120.

The image data read by the scanner unit 201 is transferred to a data processing unit 124 through the scanner IP unit 202, the digital video I/F 121 and the main bus 125. Likewise, a control command output from the scanner unit 201 is transferred to a CPU 122 through the scanner IP unit 202, the digital video I/F 121 and the main bus 125. Here, it should be noted that the data processing unit 124 is the image processing means for performing image processes such as a rotation process, a magnification change process and the like to the image data. The image data transferred from the scanner unit 201 and processed by the data processing unit 124 is further transferred to the in-MFP HD 3 or the NIC unit 204 through the main bus 125 and the I/F 120, in accordance with the control command transferred to the CPU 122 simultaneously with the image data.

When a print request command (including PDL data) is transmitted from the computer terminal 105 shown in FIG. 1 through the NIC unit 204, the CPU 122 which received the print request command through the I/F 120 transfers the simultaneously transmitted PDL data to the formatter unit 6 through the I/F 120. Then, the PDL data is extracted into the image data by the formatter unit 6, and the obtained image data is again transferred to the data processing unit 124 through the I/F 120. The image data transferred from the formatter unit 6 is subjected to the image process by the data processing unit 124, and the processed image data is further transferred to the printer IP unit 207 through the I/F 120. Thus, the image data is print-output through the printer IP unit 207, the PWM unit 208, the printer unit 209 and the finisher unit 210 as shown in FIG. 2.

In the above operation, the CPU 122 appropriately confirms the status in the formatter unit 6 and the status in IP unit 207, the PWM unit 208, the printer unit 209 and the finisher unit 210, and thus notifies the NIC unit 204, the location information obtaining unit 9 or the operation unit 5 of the status concerning the printing through the I/F 120. Moreover, the CPU 122 totally controls the above operation according to a control program stored in a memory 123 and the control command transferred from the scanner unit 201. Besides, the memory 123 is also used as the working area of the CPU 122.

As just described, the core unit 206 can control the data flow among the scanner unit 201, the scanner IP unit 202, the in-MFP HD 3, the NIC unit 204 and the formatter unit 6, whereby the core unit 206 can effectively perform the combined process including the original image reading function, the image print function, the data exchange function (between the core unit 206 and the computer terminal 105), and the like.

(Internal Structure of Data Storage Apparatus 102)

Figure 4:
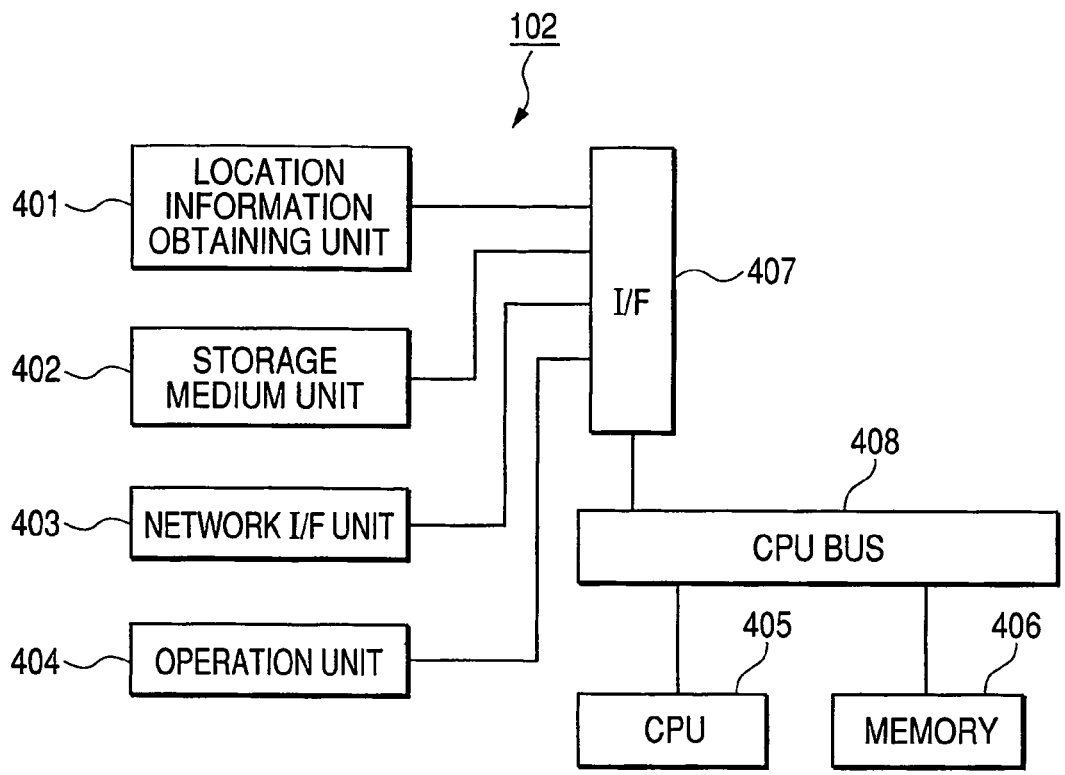
FIG. 4 is a block diagram showing an example of the internal structure of the data storage apparatus 102 shown in FIG. 1.

FIG. 4 is a block diagram showing an example of the internal structure of the data storage apparatus 102 shown in FIG. 1. In FIG. 4, numeral 401 denotes a location information obtaining unit which obtains the location information shown in FIG. 5 from closest one of the location information provisioning terminals 100-A to 100-F through close-range radio communication, and numeral 402 denotes a storage medium unit which is a large-capacity hard disk for storing various data. Besides, the storage medium unit 402 also stores access control information using the location information. Numeral 403 denotes a network I/F unit which can be connected to the network 101 by using the iSCSI protocol and thus exchange the various data through the network 101. Numeral 404 denotes an operation unit which includes a display part of displaying information concerning the status of the data storage apparatus 102, an error and the like, and operation buttons to be used by the user to handle the data storage apparatus 102.

Numeral 405 denotes a CPU which totally controls the entire process of the data storage apparatus 102 and holds therein an encryption key for encryption. When writing/reading data to/from the storage medium unit 402, the CPU 405 encrypts/decrypts the data by using the held encryption key as needed. Beside, the CPU 405 controls the location information obtaining unit 401, the storage medium unit 402, the network I/F 403 and the operation unit 404 through a CPU bus 408 and an I/F 407. In any event, the detail in the case where the CPU 405 encrypts/decrypts the data will be described later. Numeral 406 denotes a memory which acts as the work memory of the CPU 405. It should be noted that the structure of the data storage apparatus 102 is not limited to the above. That is, it only has to be the structure which at least has a function to store the data and enable the computer to read the stored data, a function to obtain the location information, and a function to perform various processes to the stored data according to the obtained location information.

(Example of Access Control Information Held in Data Storage Apparatus 102)

An example of the access control information to be held in the data storage apparatus 102 will be explained hereinafter.

FIG. 6 is a diagram showing an example of the access control information to be held in the data storage apparatus 102. In FIG. 6, current location information 600 is the location information obtained by the location information obtaining unit 401 and is also the information concerning the current location of the data storage apparatus 102. As shown in FIG. 6, floor information "31 living room (window side)" is stored as the current location information 600. Here, "31 living room" indicates a living room of the first room on the third floor. More specifically, the second-digit number "3" indicates the floor number, the first-digit number "1" indicates the room number, and the last characters "living room" indicates the kind of room. That is, for example, "42 laboratory" indicates a laboratory of the second room on the fourth floor. In the meantime, "window side" is the information which is added, as needed, in the case where the location information is obtained from the terminal, such as the location information provisioning terminal 100-C or 100-F of FIG. 1, located at the window side. In the embodiment, the location information indicated by the same floor information as "31 living room (window side)" or "42 laboratory" described above is used as the location information hereinafter.

Network activation permission location information 601 is the information for defining the area where the data storage apparatus 102 is shifted as being connected to the network 101. In FIG. 6, "31 living room" is defined as the network activation permission location information 601. In a case where the location information obtained by the location information obtaining unit 401 indicates the location other than that defined by the network activation permission location information 601, it is controlled by the data storage apparatus 102 itself not to establish the network connection.

HD installation permission location information 602 is the information for defining the range where the data storage apparatus 102 is brought out. In FIG. 6, the two rooms of "31 living room" and "32 living room" are defined as the HD installation permission location information 602. In case of changing and mending the setting of the data storage apparatus 102, it is necessary to do so within the area defined by the HD installation permission location information 602. In a case where the location information obtained by the location information obtaining unit 401 is outside the area in question, a process for preventing data leakage is performed for confidentiality if a "predetermined condition" is satisfied. That is, for example, the encryption key held in the CPU 405 is invalidated, or the data held in the storage medium unit 402 is deleted. Incidentally, an example of the "predetermined condition" necessary to perform the process for preventing data leakage and the concrete process operation concerning the "predetermined condition" will be described later.

Group equipment installation location information 603 is the information for defining the installation locations of the MFP's 103a to 103c and 104 which access the data storage apparatus 102 by using the iSCSI protocol. More specifically, the group equipment installation location information 603 is obtained by associating the location information with a group ID. Here, the group ID is to specify the equipment group of the MFP's 103a to 103c and 104 (i.e., in units of department, in units of installation location, or the like), and the location information is to specify the installation location of the equipment which belongs to the group ID in question. In FIG. 6, the location information "31 living room, 32 living room, 42 laboratory, 43 laboratory" is associated with the group ID "NATTO1".

Moreover, correspondence information of the group ID and an access key is the information which defines a group ID 604 being the information for specifying the equipment group and an access key 605 being the key (e.g., character string) for permitting the equipment group corresponding to the group ID 604 to access the hardware storage apparatus. In FIG. 6, the combination of "NATTO1" and "XXX" and the combination of "NATTO2" and "YYY" are shown as the correspondence information of the group ID 604 and the access key 606.

(Example of Access Control Information Held in MFP's 103a to 103c and MFP 104)

Next, examples of the access control information to be held in the MFP's 103a to 103c and the MFP 104 will be explained hereinafter.

FIGS. 7 and 8 are diagrams respectively showing the examples of the access control information to be held in the MFP's 103a to 103c and the MFP 104, and FIG. 7 will be explained hereinafter. In FIG. 7, current location information 700 is the location information obtained by the location information obtaining unit 9 and is also the information concerning the current location of each of the MFP's 103a to 103c. More specifically, as shown in FIG. 7, floor information "31 living room (window side)" is stored as the current location information 700. Moreover, group equipment installation location information 501 is the information for defining the installation locations of the MFP's 103a to 103c and 104 in the corresponding equipment group to which these MFP's and the like belong. As shown in FIG. 7, each of the MFP's 103a to 103c can be installed in "31 living room, 32 living room, 42 laboratory, 43 laboratory".

Moreover, correspondence information of the group ID and an access key is the information which defines a group ID 502 being the information for specifying the equipment group and an access key 503 being the key (e.g., character string) for permitting the equipment group corresponding to the group ID 502 to access the hardware storage apparatus. In FIG. 7, the combination of "NATTO1" and "XXX" is shown as the correspondence information of the group ID 502 and the access key 503. Besides, box discrimination information 504 is the information for discriminating the data storage apparatus 102, and an HDID (hard disk ID) is used in the embodiment. In FIG. 7, the HDID "SHARED BOX-A" for discriminating the data storage apparatus 102 is stored as the box discrimination information 504.

Then, the information example shown in FIG. 8 is the information example of the MFP 104 similar to that of each of the MFP's 103a to 103c, whereby the explanation thereof will be omitted. Incidentally, each of the MFP's 103a to 103c and 104 obtains a set of the group ID 502 to which the MFP in question belongs and the access key 503 which corresponds to the group ID in question, from the data storage apparatus 102. At that time, only when the MFP's 103a to 103c and 104 are installed respectively at the locations defined by the group equipment installation location information 501, they can obtain the access key 503 from the data storage apparatus 102 (or the access key 605 in the data storage apparatus 102).

Next, the process to be performed when the power supply of the data storage apparatus 102 is turned on in the information processing system shown in FIG. 1 will be explained. More specifically, a boot (or start-up) process of the data storage apparatus 102 and a box expansion process to be performed according to the boot process in the MFP's 103a to 103c and 104 connected to the network 101 will be explained. Here, it should be noted that the box expansion process is the process to register the data storage apparatus 102 as a hard disk capable of writing/reading data in the MFP's 103a to 103c and 104. That is, in each of the MFP's 103a to 103c and 104, a "box" indicates the data storage apparatus 102 registered to be usable by the MFP.

Figure 9:
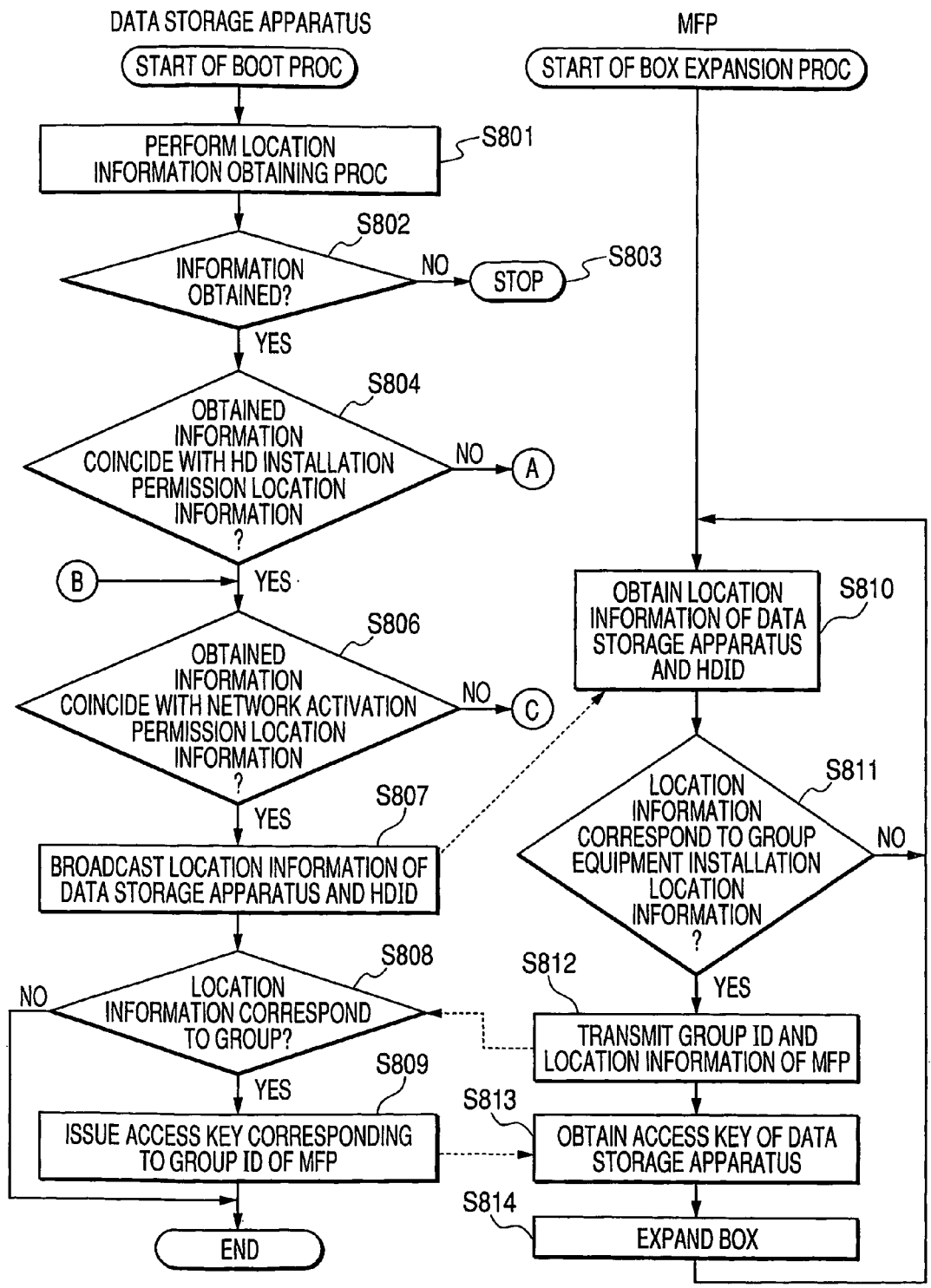
FIG. 9 is a flow chart showing the boot process to be performed when the power supply of the data storage apparatus 102 is turned on in the information processing system shown in FIG. 1.

FIG. 9 is a flow chart showing the boot process to be performed when the power supply of the data storage apparatus 102 is turned on in the information processing system shown in FIG. 1. In a step S801, when a user turns on the power supply of the data storage apparatus 102, as shown in FIG. 9, the data storage apparatus 102 causes the location information obtaining unit 401 to perform the location information obtaining process shown in FIG. 5 to obtain the location information from the closest one of the location information provisioning terminals 100-A to 100-F. Next, in a step S802, it is judged by the data storage apparatus 102 whether or not the location information obtaining unit 401 can obtain the location information. When judged that the location information obtaining unit 401 can obtain the location information (i.e., YES in the step S802), the data storage apparatus 102 sets the obtained location information to the current location information 600 shown in FIG. 6 as the information concerning the current location, and the flow advances to a step S804. Meanwhile, when judged that the location information obtaining unit 401 cannot obtain the location information (i.e., NO in the step S802), the flow stops in a step S803 and then returns to the step S801 to again perform the location information obtaining process. That is, after turning on the power supply, the data storage apparatus 102 repeats the location information obtaining step until obtaining it. Thus, during this time, the data storage apparatus 102 is in the state incapable of accessing data.

Next, in the step S804, it is judged by the data storage apparatus 102 whether or not the obtained location information (i.e., information set to the current location information 600) coincides with the HD installation permission location information 602. When judged that the obtained location information coincides with the HD installation permission location information 602 (i.e., YES in the step S804), the flow advances to a step S806. Meanwhile, when judged that the obtained location information does not coincide with the HD installation permission location information 602 (i.e., NO in the step S804), the data storage apparatus 102 performs the process in a step S805-7 shown in FIG. 10A. In the step S805-7, a data security protection process is performed so that the data does not leak outside.

Here, the process shown in FIG. 10A will be explained.

Figures 10A, 10B:
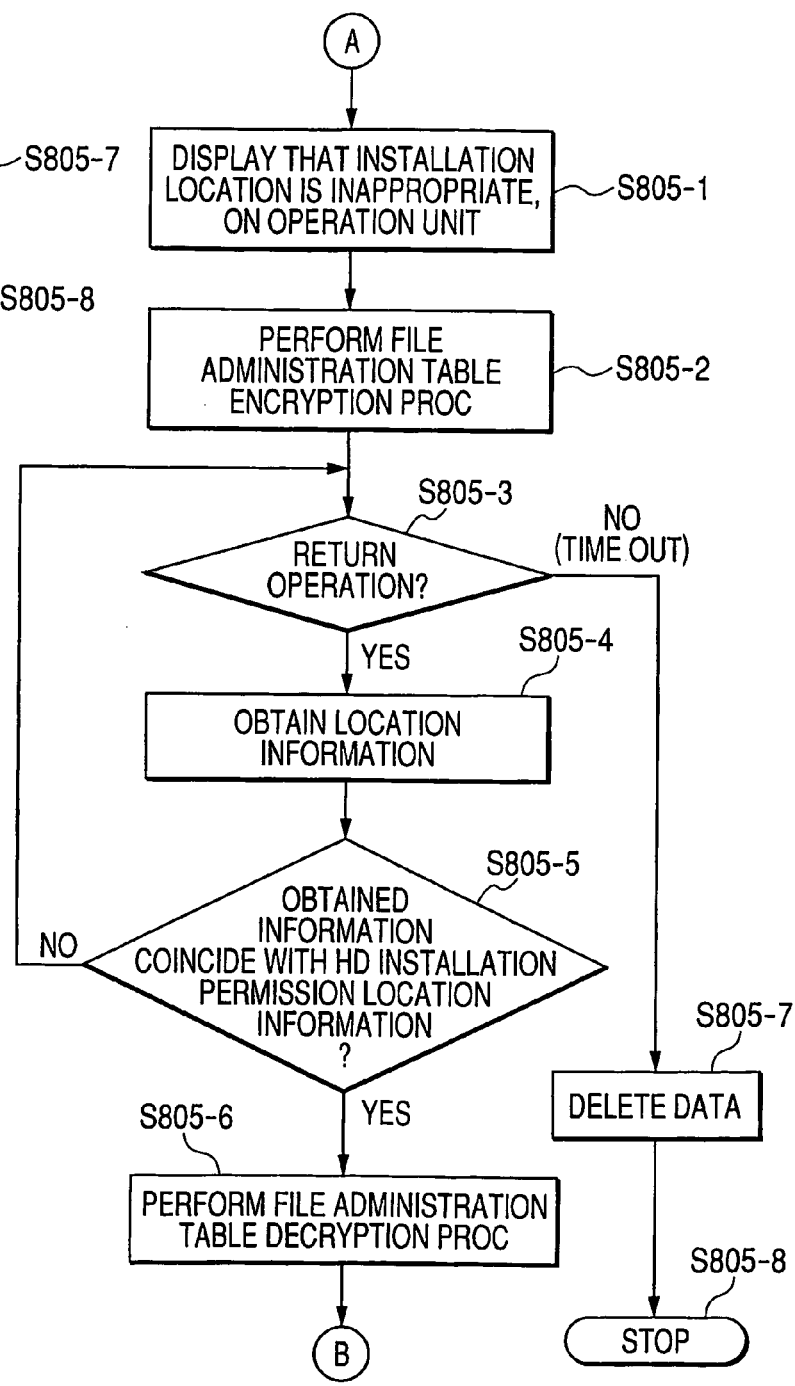
FIGS. 10A and 10B are flow charts showing an example of the data security protection process to be performed when the data storage apparatus 102 is activated outside the installation permission location.

FIG. 10A is the flow chart showing an example of the data security protection process to be performed when the data storage apparatus 102 is activated outside the installation permission location. As shown in FIG. 10A, in the step S805-7, the data storage apparatus 102 performs the process to invalidate the encryption key held in the CPU 405 and also delete the data held in the storage medium unit 402. Next, in a step S805-8, the power supply of the data storage apparatus 102 is turned off. Thus, when the data storage apparatus 102 is activated outside the location defined by the HD installation permission location information 602 shown in FIG. 6, such activation is considered as improper activation, and therefore the encryption key and the stored data are deleted to protect data security.

Again, in FIG. 9, it is judged by the data storage apparatus 102 in the step S806 whether or not the location information defined by the current location information 600 coincides with the network activation permission location information 601. When judged that the location information coincides with the network activation permission location information 601 (i.e., YES in the step S806), the flow advances to a step S807. Meanwhile, when judged that the location information does not coincide with the network activation permission location information 601 (i.e., NO in the step S806), the data storage apparatus 102 performs the process in steps S901 to S903 shown in FIG. 11. The details of the process in FIG. 11 will be explained later.

Subsequently, in the step S807, the data storage apparatus 102 broadcasts the current location information 600 and the HDID to the MFP's 103a to 103c and 104. In the following, the process to be performed when the current location information 600 and the HDID transmitted from the data storage apparatus 102 are received by the MFP 104 will be explained. Initially, in a step S810, the MFP 104 receives and obtains the current location information 600 and the HDID from the data storage apparatus 102. Next, in a step S811, it is judged by the MFP 104 whether or not the current location information 600 of the data storage apparatus 102 coincides with the group equipment installation location information 501. When judged that the current location information 600 coincides with the group equipment installation location information 501 (i.e., YES in the step S811), the flow advances to a step S812 to transmit the current location information 700 of the MFP 104 and the group ID 502 to the data storage apparatus 102. Then, the data storage apparatus 102 receives the current location information 700 of the MFP 104 and the group ID 502, and the flow advances to a step S808. Meanwhile, when judged that the current location information 600 does not coincide with the group equipment installation location information 501 (i.e., NO in the step S811), the flow returns to the step S810 to wait for the current location information 600 and the HDID transmitted from the data storage apparatus 102.

Then, in the step S808, the data storage apparatus 102 receives the current location information 700 and the group ID 502 from the MFP 104. Thus, it is judged whether or not the values of the current location information 700 and the group ID 502 coincide with the group equipment installation location information 603 being the access control information held in the data storage apparatus 102. When judged that the values of the current location information 700 and the group ID 502 coincide with the group equipment installation location information 603 (i.e., YES in the step S808), the flow advances to a step S809. Meanwhile, when judged that the values of the current location information 700 and the group ID 502 do not coincide with the group equipment installation location information 603 (i.e., NO in the step S808), the boot process ends, and then an ordinary process is performed.

Figure 13:
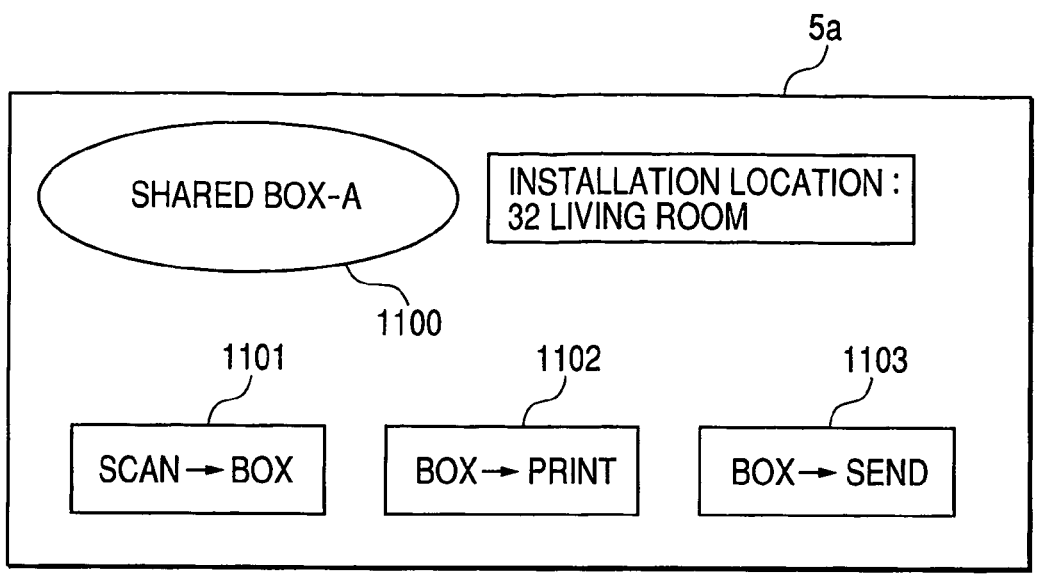
FIG. 13 is a diagram showing an example of the operation screen of each of the MFP's 103*a* to 103*c* and the MFP 104 shown in FIG. 1.

Next, in the step S809, to the MFP 104 which transmitted the group ID 502 and the current location information 700, the data storage apparatus 102 transmits a set of the group ID 604 being the same as the group ID 502 and the corresponding access key 605. Thus, in a step S813, the MFP 104 obtains the group ID 604 of the data storage apparatus 102 and the corresponding access key 605, and stores them as the group ID 502 and the corresponding access key 503. Subsequently, in a step S814, the MFP 104 expands the data storage apparatus 102 as the box, and displays the HDID "SHARED BOX-A" of the data storage apparatus 102 in a box discrimination information display area 1100 on an operation screen 5*a* of the operation unit 5 as shown in FIG. 13. Thus, the MFP 104 can store the data in the data storage apparatus 102, and the box expansion process ends. Here, it should be not that each of the MFP's 103*a* to 103*c* and 104 performs the process shown in the flow chart of FIG. 9.

FIG. 13 is the diagram showing an example of the operation screen of each of the MFP's 103*a* to 103*c* and the MFP 104 shown in FIG. 1. As shown in FIG. 13, the information "32 living room" concerning the installation location of the data storage apparatus 102 of which the HDID is displayed in the box discrimination information display area 1100 is also displayed on the operation screen 5*a*. Besides, a scan indication button 1101 for indicating the scanner unit 201 to read an original and record the read original image data to the shared box-A (=data storage apparatus 102) is included in the operation screen 5*a*. Moreover, a print indication button 1102 for indicating the printer unit 209 to print the image data stored in the shared box-A (=data storage apparatus 102) and a transmission indication button 1103 for indicating the FAX unit 203 to transmit the image data stored in the shared box-A (=data storage apparatus 102) are likewise included in the operation screen 5*a*.

As described above, the data storage apparatus 102 in the embodiment can confirm the installation location of the apparatus itself when the power supply is turned on, confirm the mutual installation locations of the MFP's 103*a* to 103*c* and 104, and then write/read the data to/from the MFP's 103*a* to 103*c* and 104. That is, the data can be transmitted/received under the circumstance that the mutual locations of the equipments (data storage apparatus 102, MFP's 103*a* to 103*c*, and MFP 104) on the network can be assured. Specifically, in the information processing system according to the embodiment, the confirmation (first check) as to whether or not the installation location of the data storage apparatus 102 itself at the time of activation is appropriate, the confirmation (second check) as to whether or not the installation location of the data storage apparatus 102 is appropriate for the MFP's 103*a* to 103*c* and 104, and the confirmation (third check) as to whether or not the installation locations of the MFP's 103*a* to 103*c* and 104 are appropriate for the data storage apparatus 102 are performed. Thus, by such triple checks, it is possible to prevent that the data stored in the data storage apparatus 102 is used at the location other than the predetermined location. Moreover, as shown in FIGS. 10A and 10B, when the data storage apparatus 102 is used at the location other than the predetermined location, the data storage apparatus 102 itself can perform the process to prevent data leakage.

It should be noted that, in the embodiment, the process to prevent data leakage is not limited to the process of FIG. 10A. That is, the process shown in FIG. 10B may be performed. Hereinafter, another process shown in FIG. 10B to prevent data leakage will be explained.

Figure 16:
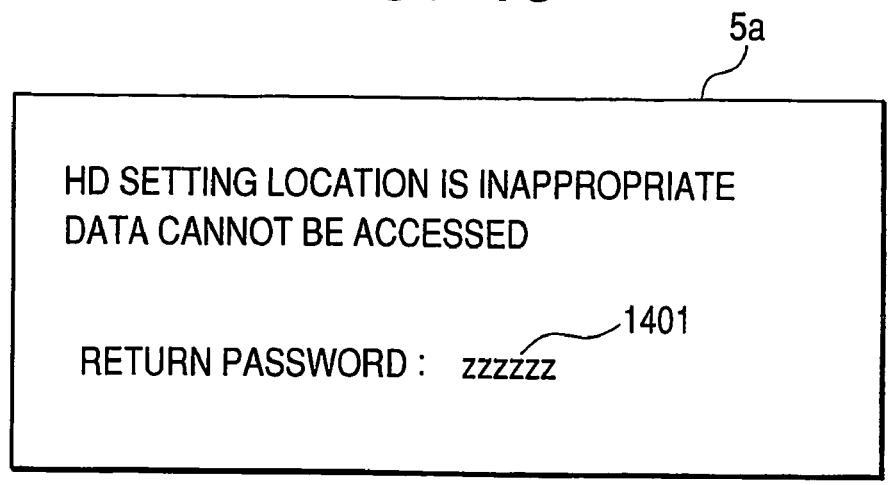
FIG. 16 is a diagram showing an example of the access non-permission message to be displayed on the operation screen 5*a* of the operation unit 5.

FIG. 10B is the flow chart showing another example of the data security protection process to be performed when NO in the step S804 of FIG. 9. First, in a step S805-1, the data storage apparatus 102 displays a message as shown in FIG. 16 on the operation screen 5*a* of the operation unit 5 to inform the user that access is impossible because the installation location is inappropriate. Also, the data storage apparatus 102 displays a return password input section 1401 to request the user to input a password for returning data access.

Next, in a step S805-2, the data storage apparatus 102 encrypts, by using an encryption key held in the CPU 405, a file administration table in the storage medium unit 402, whereby it is possible to further reduce risk of data leakage in the storage medium unit 402. Then, in a step S805-3, the data storage apparatus 102 waits until the user inputs the password to the return password input section 1401 (i.e., return operation). In such a case, while the data storage apparatus 102 is waiting for the return operation in the step S805-3, the user can shift or move the data storage apparatus 102 to an appropriate location. Here, it should be noted that the password in question is the information which has already been notified to the normal user of the data storage apparatus 102.

When the correct password is input to the return password input section 1401 (i.e., YES in the step S805-3), the flow advances to a step S805-4. Meanwhile, when the correct password is not input to the return password input section 1401 and a certain period of time elapses (i.e., NO in the step S805-3), the flow advances to a step S805-7 to perform a data deletion (or erasure) process. Incidentally, it should be noted that the process in the steps S805-7 to S805-8 shown in FIG. 10B is equivalent to that in the steps S805-7 to S805-8 shown in FIG. 10A, whereby the explanation thereof will be omitted.

In the step S805-4, the location information obtaining unit 401 of the data storage apparatus 102 obtains the location information from the closest one of the location information provisioning terminals 100-A to 100-F as shown in FIG. 5, whereby the obtained location information is set to the current location information 600 shown in FIG. 6. Then, in the step S805-5, it is judged by the data storage apparatus 102 whether or not the obtained location information (i.e., the location information set to the current location information 600) coincides with the HD installation permission location information 602. When judged that the obtained location information coincides with the HD installation permission location information 602 (i.e., YES in the step S805-5), the flow advances to the step S805-6. Meanwhile, when judged that the obtained location information does not coincide with the HD installation permission location information 602 (i.e., NO in the step S805-5), the flow returns to the step S805-3.

In the step S805-6, the data storage apparatus 102 decrypts, by using the encryption key held in the CPU 405, the file administration table in the data storage apparatus 102 encrypted in the step S805-2. After the process in the step S805-6, the flow advances to the step S806 shown in FIG. 9.

As described above, when the data storage apparatus 102 is activated outside the defined location, it is possible to take various actions such as the data encryption, the data deletion and the like to prevent the data leakage in accordance with the condition of the data storage apparatus 102.

Next, the process that the data storage apparatus 102 changes the network activation permission location information 601 when the result of the step S806 in FIG. 9 is "NO" will be explained.

Figure 11:
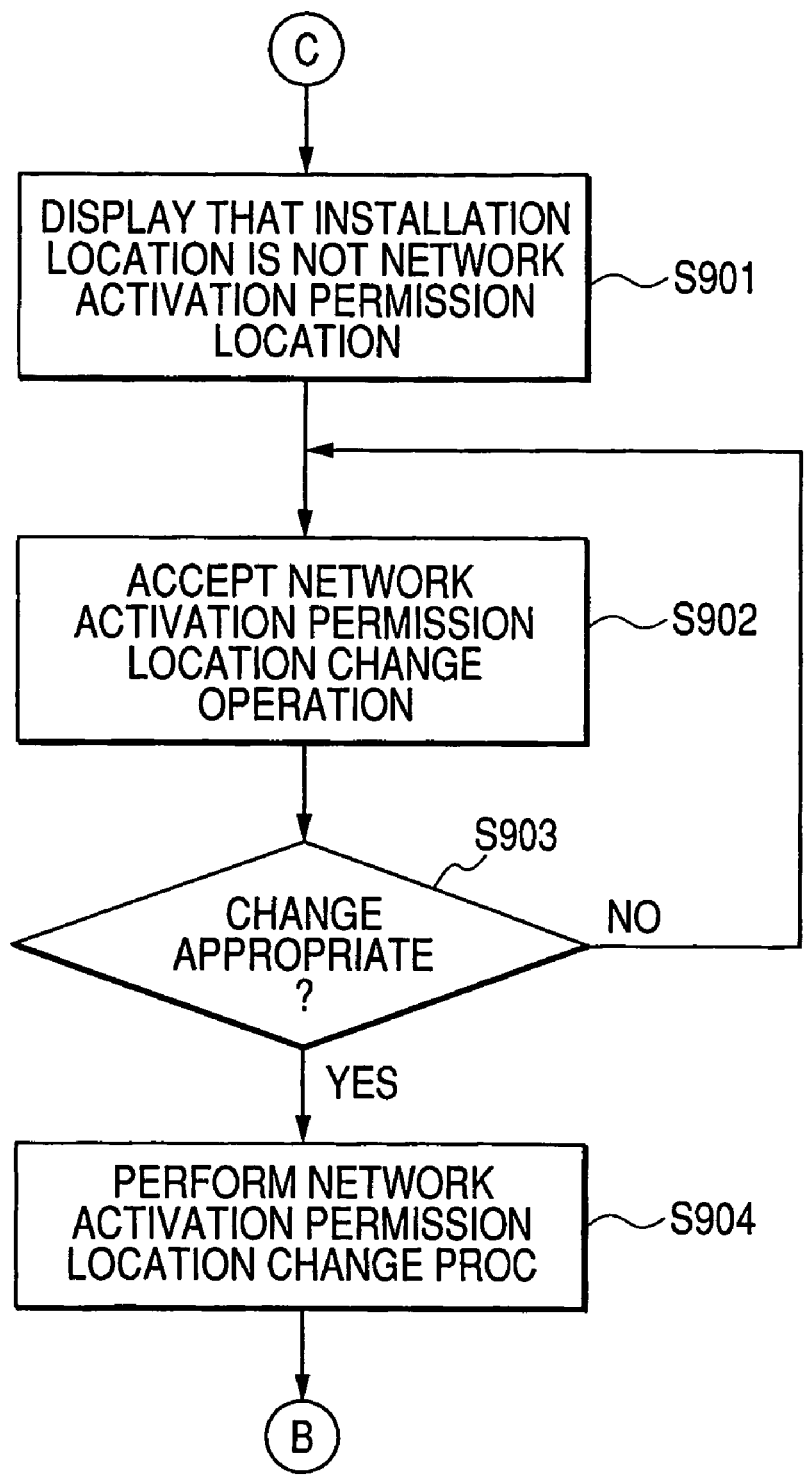
FIG. 11 is a flow chart showing an example of the process that the data storage apparatus 102 changes the network activation permission location information 601 when the result of the step S806 in FIG. 9 is "NO"
Figure 14:
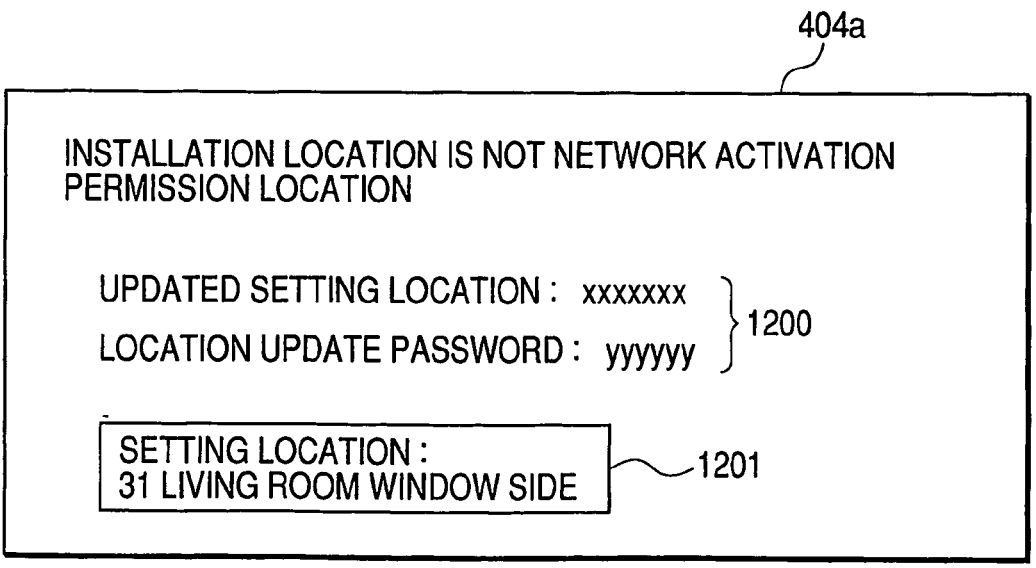
FIG. 14 is a diagram showing an example of the message and the setting change GUI (graphical user interface) to be displayed on the operation screen 404*a* of the operation unit 404.

FIG. 11 is a flow chart showing an example of the process that the data storage apparatus 102 changes the network activation permission location information 601 when the result of the step S806 in FIG. 9 is "NO". Initially, in the step S901, the data storage apparatus 102 displays a message and a setting change GUI (graphical user interface) as shown in FIG. 14 on an operation screen 404*a* of the operation unit 404. Here, it should be noted that the displayed message is, for example, the message to inform the user that the installation location of the data storage apparatus 102 is not the network activation permission location as shown in FIG. 14.

Moreover, in FIG. 14, numeral 1200 denotes an update setting input area which is used to urge the user to input an update setting location and a location update password. Numeral 1201 denotes a setting area change button which is used to display the screen shown in FIG. 15 on which the network activation permission location information 601, the HD installation permission location information 602 and the group equipment installation location information 603 shown in FIG. 6 are set through the GUI. Incidentally, the contents of FIG. 15 will be later explained in detail.

When the user inputs the update setting location and the location update password in the update setting input area 1200 shown in FIG. 14, in the step S902, the data storage apparatus 102 accepts the update setting location and the location update password as the information for changing the new network activation permission location information 601. Next, in the step S903, the data storage apparatus 102 judges whether or not the location update password accepted in the step S902 is appropriate, and further judges whether or not the new network activation permission location information 601 (update setting location) is within the range of the HD installation permission location information 602. Then, when judged that the location update password is appropriate and the new network activation permission location information 601 is within the range of the HD installation permission location information 602 (i.e., YES in the step S903), in a step S904, the data storage apparatus 102 updates the network activation permission location information 601. Meanwhile, when judged that the location update password is not appropriate and/or the new network activation permission location information 601 is not within the range of the HD installation permission location information 602 (i.e., NO in the step S903), the flow returns to the step S902.

As described above, the data storage apparatus 102 can set to update the network connection location within a predetermined range (i.e., HD installation permission location range), whereby it is possible to prevent that the data storage apparatus 102 at an unanticipated location is connected to the network 101, and it is thus possible to reduce risk of data leakage.

(Data Writing from MFP 104 to Data Storage Apparatus 102)

Next, an example of the process that, after the data storage apparatus 102 was set as the box of the MFP 104 as the result of the boot process shown in FIG. 9, the data writing is performed from the MFP 104 to the data storage apparatus 102 will be explained.

Figure 12:
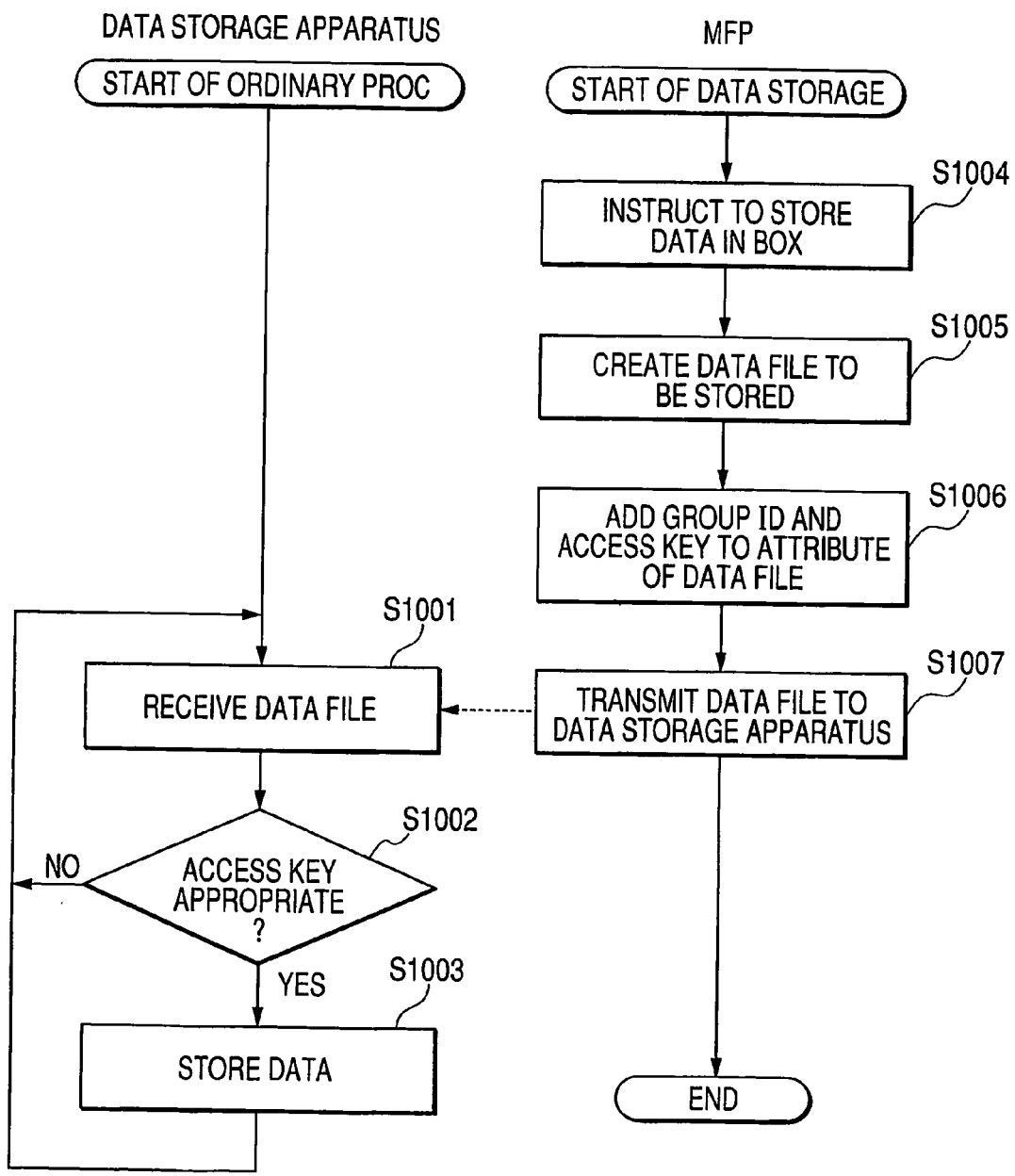
FIG. 12 is a flow chart showing an example of the process to be performed when data writing from the MFP 104 to the data storage apparatus 102 is performed.

FIG. 12 is a flow chart showing the example of the process to be performed when the data writing from the MFP 104 to the data storage apparatus 102 is performed. First of all, when the scan indication button 1101 on the operation screen 5a shown in FIG. 13 is depressed by the user, in a step S1004, the MFP 104 recognizes such button depression as an instruction to write scanner data to the box (data storage apparatus 102). Here, it should be noted that the instruction in question also includes an instruction to scan a paper original.

Next, in a step S1005, the MFP 104 causes, in response to the instruction recognized in the step S1004, the scanner unit 201 to read the paper original and create the data file to be stored in the box. Subsequently, in a step S1006, the MFP 104 adds the group ID 502 of the MFP 104 and the access key 503 of the data storage apparatus 102 corresponding to the group ID 502 to the created data file. More specifically, the MFP 104 stores the group ID 502 and the access key 503 in the attribute information of the data file. Next, in a step S1007, the MFP 104 transmits the created data file to the data storage apparatus 102 by using the iSCSI protocol. Thus, the data storage process to the box (data storage apparatus 102) by the MFP 104 ends.

Subsequently, in a step S1001, the data storage apparatus 102 receives the data file transmitted from the MFP 104. Next, in a step S1002, the data storage apparatus 102 refers the attribute information of the received data file to judge whether or not the group ID 502 and the access key 503 added in the attribute information are proper. When judged that the group ID 502 and the access key 503 are proper (i.e., YES in the step S1002), the flow advances to a step S1003. In this step, the data storage apparatus 102 stores the received data file in the storage area of the hard disk (storage medium unit 402) corresponding to the group ID 502.

As described above, by registering the data storage apparatus 102 as the box, the MFP 104 can use the data storage apparatus 102 as if it is a built-in hard disk.

(Example of Installation Area Setting Screen)

Figure 15:
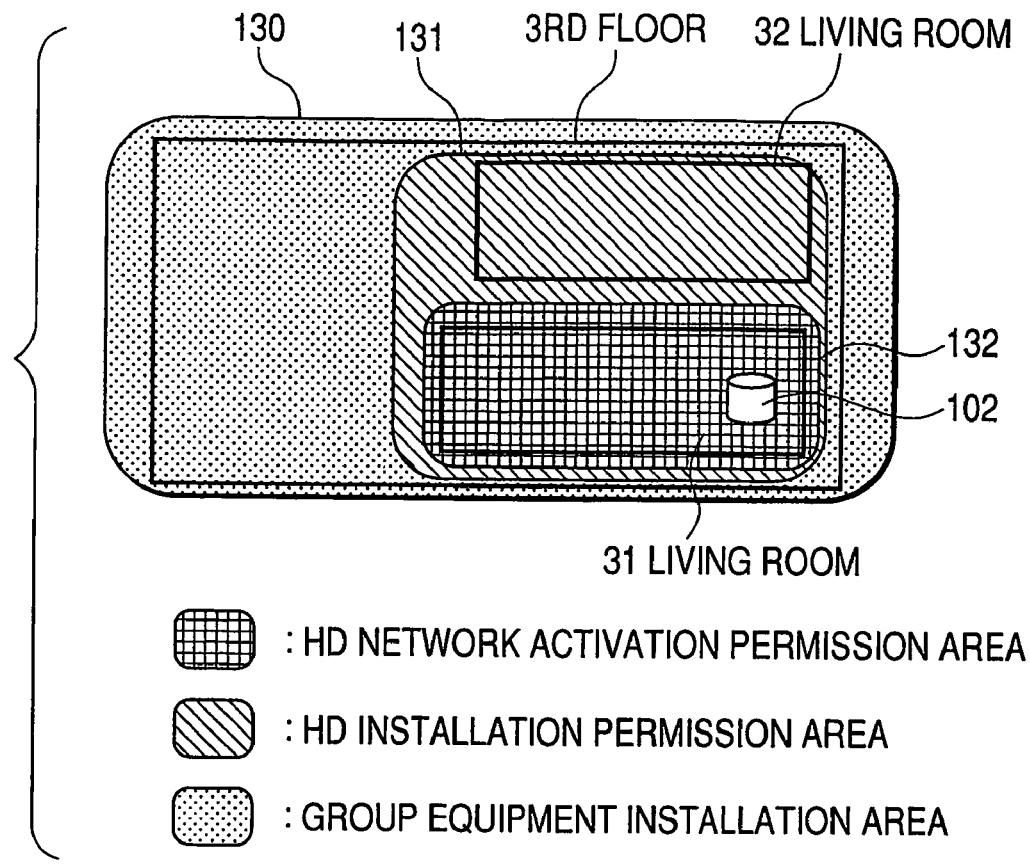
FIG. 15 is a diagram showing an example of the screen to be used to display/change various setting areas concerning the data storage apparatus 102.

FIG. 15 is a diagram showing an example of the screen to be used to display/change the various setting areas concerning the data storage apparatus 102. Here, it should be noted that the screen shown in FIG. 15 is the screen which is displayed when the setting area change button 1201 of the operation screen 404a shown in FIG. 14 is depressed by the user. As shown in FIG. 15, it is possible to set a network activation permission area 132, an HD installation permission area 131 and a group equipment installation area 130 as the setting areas of the data storage apparatus 102 in the 31 living room and the 32 living room on the third floor. Here, it should be noted that the network activation permission area 132, the HD installation permission area 131 and the group equipment installation area 130 are the areas respectively specified by the new network activation permission location information 601, the HD installation permission location information 602 and the group equipment installation location information 603 shown in FIG. 6. On the screen, the user can change the setting area by using the GUI. Thus, by displaying the setting area visually, it is possible for the user to easily know and grasp the mutual positional relation between the installation areas of the group equipment and the data storage apparatus 102.

Incidentally, the process of the steps S810 to S814 shown in FIG. 9 and the process of the steps S1004 to S1007 shown in FIG. 12 are achieved when the CPU 122 of each of the MFP's 103a to 103c and 104 executes the programs for achieving these processes. Besides, the process of the steps S801 to S809 shown in FIG. 9, the process of the steps S805-1 to S805-8 shown in FIGS. 10A and 10B, the process of the steps S901 to S904 shown in FIG. 11, and the process of the steps S1001 to S1003 shown in FIG. 12 are achieved when the CPU 405 of the data storage apparatus 102 executes the programs for achieving these processes.

Moreover, although the data storage apparatus 102 uses the hard disk as the means for storing various data, the present invention is not limited to this. That is, it is also suitable to use various recording media such as non-volatile memories (flash memory, etc.) and the like as the means for storing data. Besides, although the data storage apparatus 102 includes the operation unit 404 having the display unit, the present invention is not limited to this. For example, the computer terminal 105 shown in FIG. 1 may function as the operation unit 404. That is, the computer terminal 105 may display the screens shown in FIGS. 14 and 15 by obtaining the status information, the access control information and the like from the data storage apparatus 102.

Moreover, in the embodiment described as above, the programs for achieving the various processes shown in FIGS. 9, 10A, 10B, 11 and 12 in the data storage apparatus 102 and the MFP's 103a to 103c and 104 are read from the memories and executed by the CPU's, thereby achieving the functions of these processes. However, the present invention is not limited to this. That is, a part or all of the functions of the respective processes may be achieved by dedicated hardware.

Moreover, the above memory may include a magnetooptical disk, a non-volatile memory such as a flash memory or the like, a recording medium such as a CD-ROM or the like capable of performing only data reading, a volatile memory other than a RAM, or a computer readable/writable recording medium made by composing such memories as above.

Moreover, the present invention may be applied to a case where the program for achieving a part of the functions of the various processes in the data storage apparatus 102 and the MFP's 103a to 103c and 104 is recorded on a computer-readable recording medium, the program recorded on the recording medium in question is read and supplied into a computer system, and the part of the processes is actually performed based on the program supplied into the computer system. Here, it should be noted that the computer system includes an OS (operating system), hardware such as peripherals and the like.

Moreover, the above program may be transmitted from the computer system which has stored the program in question in its memory or the like to another computer system through a transmission medium or a transmission wave in the transmission medium. Here, it should be noted that the transmission medium for transmitting the program is the medium which has an information transmission function. For example, a network (communication network) such as the Internet or the like, a communication network (communication line) such as a telephone network or the like, and the like may be used as the transmission medium.

Moreover, the above program may achieve a part of the above functions. Besides, the above program may be a so-called difference file (difference program) capable of achieving the above functions through a combination with the program already recorded in the computer system.

Moreover, a program product such as a computer-readable recording medium or the like on which the above program has been recorded may be applied to the embodiment of the present invention.

As described above, the embodiment of the present invention has been explained in detail with reference to the attached drawings. However, the concrete structure and configuration are not limited to those in the above embodiment. That is, the present invention includes designs and the like which are within the range not departing from the concept of the present invention.

According to the present invention, it is controlled to disable from reading the data stored in the recoding medium in accordance with the specified location, whereby the process for preventing data leakage can be performed when the data storage apparatus is used at the location other then the predetermined location.

Besides, the data to be used in the data processing apparatus are stored and unitarily administrated in the data storage apparatus, whereby it is possible to simplify the administration of the data to be used in the plural data processing apparatuses connected to the network.

This application claims priority from Japanese Patent Application No. 2003-391064 filed Nov. 20, 2003, which is hereby incorporated by reference herein.

The invention claimed is:

1. A data storage apparatus which has a recording medium for storing data, comprising:
    an information storage unit adapted to store area information indicating plural areas respectively corresponding to different attributes;
    a location specifying unit adapted to externally receive a signal and thus specify a location; and
    a control unit adapted to perform control to disable from reading the data stored in said recording medium if the location specified by said location specifying unit is not within a first area corresponding to a first attribute, and disable from changing the area information stored by said information storage unit if the location specified by said location specifying unit is not within a second area corresponding to a second attribute.

2. A data storage apparatus according to claim 1, wherein,
    when it is judged that the location is not within said second area, said control unit again judges whether or not the location is within said first area after performing a restoration operation, and,
    when it is judged that the location is within said first area, said control unit enables to read the data stored in said recording medium.

3. A data storage apparatus according to claim 1, wherein, when the location is outside said second area, said control unit deletes the data stored in said recording medium.

4. A data storage apparatus according to claim 1, wherein, when said location specifying unit cannot specify the location, said control unit performs the control to disable from reading the data stored in said recording medium.

5. A data storage apparatus according to claim 1, wherein, if the location specified by said location specifying unit is not within the second area, said control unit performs any one of a turning-off process of turning off a power supply of said recording medium, a, deleting process of deleting the data in said recording medium, and an encrypting process of encrypting the data in said recording medium, or performs a process obtained by combining the turning-off process, the deleting process and the encrypting process.

6. A data storage apparatus according to claim 5, further comprising:
    a data storage unit adapted to store encryption data for performing the encrypting process of encrypting the data in said recording medium,
    wherein, when performing the deleting process, said control unit deletes the encryption data stored in said data storage unit.

7. A data storage apparatus according to claim 1, further comprising:
    a communication unit adapted to perform communication with an external data processing apparatus through a network;
    an attribute information obtaining unit adapted to obtain attribute information of said data processing apparatus through said communication unit; and
    an issuance and transmission unit adapted to issue access permission information for permitting said data processing apparatus to access said recording medium in accordance with the attribute information, and transmit the issued access permission information to said data processing apparatus through said communication unit.

8. A data storage apparatus according to claim 7, wherein the attribute information includes at least information concerning an installation location of said data processing apparatus.

9. A data storage apparatus according to claim 7, further comprising:
a reception unit adapted to receive, together with the access permission information, an access request to said recording medium from said data processing apparatus through the network,
wherein said control unit judges whether or not to permit the access to said recording medium on the basis of the access permission information received by said reception unit.

10. A data storage apparatus which has a recording medium for storing data, comprising:
an information storage unit adapted to store area information indicating plural areas respectively corresponding to different attributes;
a reception unit adapted to externally receive location information; and
a control unit adapted to perform control to disable from reading the data stored in said recording medium if the location represented by the location information received by said reception unit is not within a first area corresponding to a first attribute, and disable from changing the area information stored by said information storage unit if the location represented by the location information received by said reception unit is not within a second area corresponding to a second attribute.

11. A data storage apparatus according to claim 10, wherein,
when it is judged that the location is not within said second area, said control unit again judges whether or not the location is within said first area after performing a restoration operation, and,
when it is judged that the location is within said first area, said control unit enables to read the data stored in said recording medium.

12. A data storage apparatus according to claim 10, wherein,
when the location is outside said second area, said control unit deletes the data stored in said recording medium.

13. A data storage apparatus according to claim 10, further comprising:
a communication unit adapted to perform communication with an external data processing apparatus through a network;
an attribute information obtaining unit adapted to obtain attribute information of said data processing apparatus through said communication unit; and
an issuance and transmission unit adapted to issue access permission information for permitting said data processing apparatus to access said recording medium in accordance with the attribute information, and transmit the issued access permission information to said data processing apparatus through said communication unit.

14. A data storage method which uses a data storage apparatus having a recording medium for storing data, comprising:
a first step of storing area information indicating plural areas respectively corresponding to different attributes;
a second step of externally receiving a signal and thus specifying a location;
a third step of performing control to disable from reading the data stored in the recording medium if the location specified in said second step is not within a first area corresponding to a first attribute; and
a fourth step of performing control to disable from changing the area information if the location specified in said second step is not within a second area corresponding to a second attribute.

* * * * *